United States Patent [19]

Pollatta et al.

[11] Patent Number: 5,554,430
[45] Date of Patent: Sep. 10, 1996

[54] LOW CTE BORON/CARBON FIBER LAMINATE

[75] Inventors: David J. Pollatta, Webster; Thomas N. Quinzi, East Rochester, both of N.Y.

[73] Assignee: Eastman Kodak Company, Rochester, N.Y.

[21] Appl. No.: 363,676

[22] Filed: Dec. 23, 1994

[51] Int. Cl.$^6$ .............................. B32B 5/12; B32B 5/06; D04H 3/02
[52] U.S. Cl. .......................... 428/113; 428/114; 428/302; 428/294; 428/408; 428/902
[58] Field of Search ................................ 428/294, 113, 428/114, 302, 902, 408

[56] References Cited

U.S. PATENT DOCUMENTS 3,755,061  8/1973  Schurb ................................. 161/143
4,888,247  12/1989  Zweben et al. ........................ 428/105
5,208,090  5/1993  Okitsu et al. ........................ 428/113

FOREIGN PATENT DOCUMENTS 0436391  7/1991  European Pat. Off. ........ B29C 67/14

Primary Examiner—James Withers
Attorney, Agent, or Firm—David M. Woods

[57] ABSTRACT

A boron/carbon fiber 1D laminate comprising a boron fiber layer and a carbon fiber layer having a balanced pair of carbon fiber plies embedded in a plastic resin matrix has a coefficient of thermal expansion between ±0.54 μm/m/°C. and a specific modulus greater than $8.9 \times 10^6$ meter. A 2D boron/carbon fiber quasi-isotropic laminate having two sets of quasi-isotropic boron fiber plies, two sets of quasi-isotropic carbon fiber plies, the laminate has a Coefficient of Thermal Expansion between ±0.54 μm/m/°C. in two orthogonal directions, a specific modulus greater than $5.2 \times 10^6$ meter in two orthogonal directions. The laminates are useful for optical mounting structures.

9 Claims, 4 Drawing Sheets

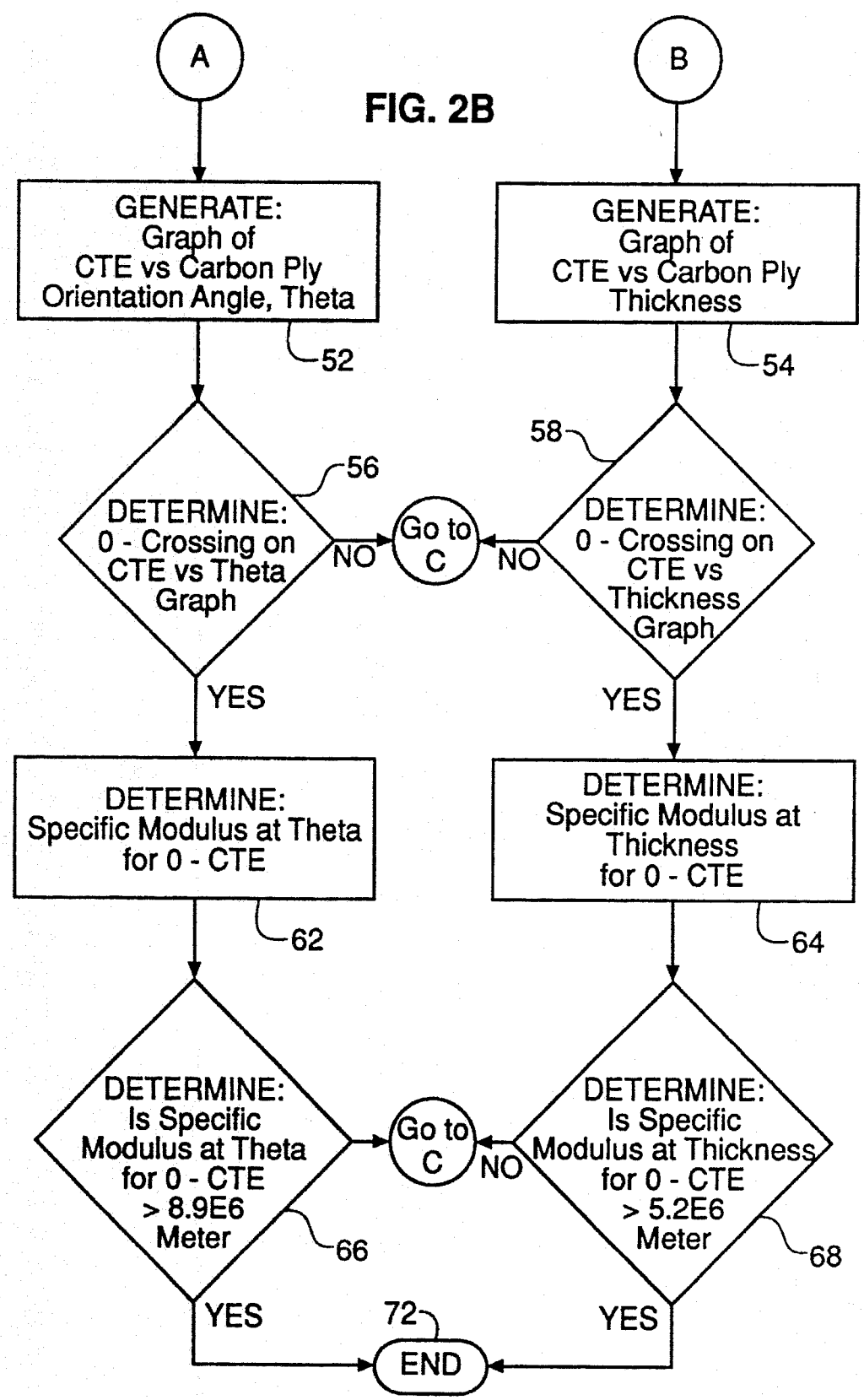

5,554,430

LOW CTE BORON/CARBON FIBER LAMINATE

This invention was made with Government support under contract number FA7056-92-0020 awarded by the Department of Defense. The Government has certain rights in this invention.

FIELD OF THE INVENTION

The present invention relates generally to boron/carbon fiber laminates and particularly to such laminates having low coefficients of thermal expansion, and a method of making them.

BACKGROUND OF THE INVENTION

Optical support structures in imaging systems must possess excellent stability during testing and operations. Two of the most important structural parameters affecting stability are stiffness and Coefficient of Thermal Expansion (CTE).

The stiffness of a structural member is related to the modulus of elasticity, or modulus, for the structural material. The weight of the structural material is related to the material density. The specific modulus of a structural material is the modulus divided by the density. The specific modulus for a structural material is proportional to the stiffness to weight ratio. The specific modulus is more convenient to compute and is therefore used as a comparison parameter for structural materials.

Carbon fiber reinforced plastic (CFRP), often referred to as composite laminate materials, is a well known class of materials that is used in structural applications ranging from aircraft to fishing poles due to its high stiffness to weight ratio and high strength to weight ratio, which can be much higher than metals. The material consists of various layers, or plies, oriented and stacked in a prescribed pattern (analogous to plywood) tailored to meet the structural requirements of the member. Each layer of the laminated sheet consists of reinforcing fibers such as carbon, glass, or boron imbedded in a plastic resin. It has been demonstrated that it is possible to achieve laminates possessing near zero CTE in one or both orthogonal directions (both 1D or 2D) with high stiffness and low weight. The near-zero CTE attainable is equal to or lower (better) than that of Invar, a steel alloy with the lowest CTE possessed by a traditional metal material (0.54 μm/m/°C.), although, the stiffness to weight ratio of Invar is well below that which can be achieved with carbon fiber composite laminates.

The CTE of a laminate, as well as its strength and stiffness, is determined by the type of fiber selected, the orientation of each layer of those fibers, and the fiber volume fraction (ratio of the volume of fibers to the total volume of the laminate). Carbon fibers have a negative CTE in the direction of the fiber. In general, the CTE varies with the modulus of the fiber, i.e. the stiffer the fiber, the more negative the CTE. Resins have a positive CTE. For a 1D laminate and a given fiber, resin, and fiber volume fraction, it is necessary to orient some or all of the carbon fibers at some ±Theta angle relative to a reference direction in order to produce a laminate with a near-zero CTE in that direction. As noted herein, "reference direction" refers to the direction relative to which the fiber orientation angles are measured. However, as the Theta angle is increased, the modulus of the laminate decreases. Currently carbon fibers in the 210–345 GPa modulus range produce the highest stiffness to weight ratio laminates with near-zero CTE. Higher modulus carbon fibers (520–830 GPa) can also be used to achieve near-zero CTE laminates. Again, these fibers generally have a larger negative CTE than the 210–345 GPa modulus fibers. Consequently, larger ply angles (±Theta) are required to achieve near-zero CTE. The resulting laminate modulus and therefore, specific modulus, is equal to or less than the 210–345 GPa modulus carbon fibers. The high negative CTE of the high modulus fibers prohibits increasing the laminate specific modulus above that attained by the 210–345 GPa fibers.

To achieve a near-zero CTE laminate in 2 orthogonal directions (2D laminate) a quasi-isotropic or near quasi-isotropic layup is typically used. The quasi-isotropic layup produces material properties (modulus, CTE, etc.) that are equal in the reference direction and 90° to the reference direction. For a given fiber and matrix material, the fiber volume of the carbon plies in the quasi-isotropic layup is varied until a near-zero CTE laminate is achieved. Currently a 520 GPa carbon fiber is used in a quasi-isotropic layup to produce a laminate with near-zero CTE in 2 orthogonal directions (2D near-zero CTE laminate). These fibers currently produce the highest specific modulus 2D near-zero CTE laminates. Higher modulus fibers (above 520 GPa to 830 GPa) can be used, however a lower fiber volume is required. This reduces the laminate modulus to near the modulus for the 520 GPa fiber. The specific modulus of a quasi-isotropic laminate using higher modulus fibers is near the specific modulus for a quasi-isotropic laminate using the 520 GPa fiber. The higher modulus fibers are generally more costly than the 520 GPa fibers therefore the 520 GPa fibers are typically used for 2D near-zero laminates.

The current state of the art carbon laminates can be utilized to produce structural components, for example lens mounting structures in optical systems with the CTE equivalent to or lower than Invar, at a much higher specific modulus. There exists a need for structural components with low CTE's with even higher specific modulus. This need to increase specific modulus is driven by the demand to decrease structural weight, increase overall structural stiffness, reduce material cost, or a combination of these factors, while maintaining dimensional stability. This invention addresses the need for structural components exhibiting near-zero CTE, with higher stiffness to weight ratios than currently have been achieved.

SUMMARY OF THE INVENTION

This need is met according to the present invention by providing a fiber reinforced resin laminate with higher specific modulus and near-zero CTE by mixing layers of positive CTE, high stiffness boron fiber with layers of high modulus (520–830 GPa) carbon fiber. The positive CTE boron fibers compensate for the negative CTE of the carbon fibers, thus allowing the higher modulus carbon fibers to be more fully utilized. By selecting the fiber volume fraction of the boron fiber (between 0.50 and 0.65), the fiber volume fraction of the carbon fiber (between 0.50 and 0.65), and ply orientation angles (between 0 and 90 degrees), a laminate with near-zero CTE (CTE between ±0.54 μm/m/°C.) and greater specific modulus ($12.7 \times 10^6$ meter to $22.4 \times 10^6$ meter for 1D laminates and $6.8 \times 10^6$ meter to $8.1 \times 10^6$ meter for 2D laminates) than previously possible is obtained.

In addition, boron fibers can be combined with carbon fibers in the 210–345 GPa range to produce 1D near-zero CTE laminates. The specific modulus of these 1D near zero CTE carbon fiber laminates ($8.4 \times 10^6$ meter to $8.9 \times 10^6$ meter) can be increased ($8.9 \times 10^6$ meter to $12.7 \times 10^6$ meter)

when combined with boron fibers. This gives a wide range of carbon fibers (210–830 GPa) that can be combined with boron fibers that produce 1D near-zero CTE laminates at a higher specific modulus than is possible with carbon-only 1D laminates.

Since a wider range of carbon fibers (210–830 GPa) can be combined with boron to produce near-zero CTE, the invention may also be used to provide a wider range of laminate stiffness values that can be used to tailor the dynamic response of a structure or structural member. The dynamic response can be tailored while maintaining a near-zero CTE structure or structural member.

The invention may also be used to provide a particular CTE value with a higher stiffness laminate than was previously possible with carbon-only laminates. The particular CTE laminate may be combined with other structural materials to provide overall near-zero CTE with higher specific modulus than was previously possible.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
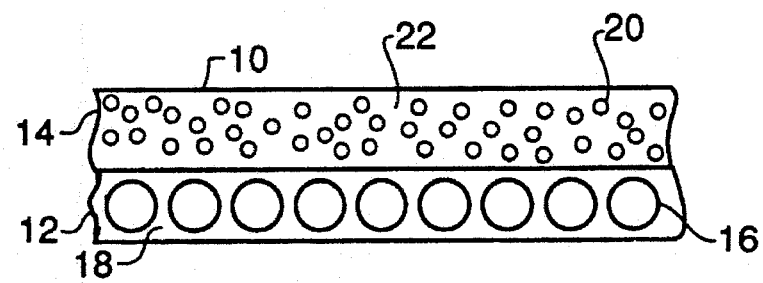
FIG. 1 Is a schematic cross section of a boron/carbon fiber laminate according to the present invention.

FIG. 1 is a schematic cross section of a high specific modulus, near-zero CTE laminate according to the present invention. The general laminate is designated 10 and is composed of boron fiber layer 12 comprised of one or more balanced boron fiber plies and one or more carbon fiber layers 14 comprising balanced pairs of carbon fiber plies. The boron fibers 16 reinforce a thermosetting resin matrix 18. The boron fibers 16 combined with the thermosetting resin matrix 18 constitute the boron fiber ply 12. The carbon fibers 20 reinforce a thermosetting resin matrix 22. The carbon fibers 20 combined with the thermosetting resin matrix 22 constitute the carbon fiber ply 14. The boron and carbon fiber plies are generally arranged at an angle relative to each other.

Figure 2A:
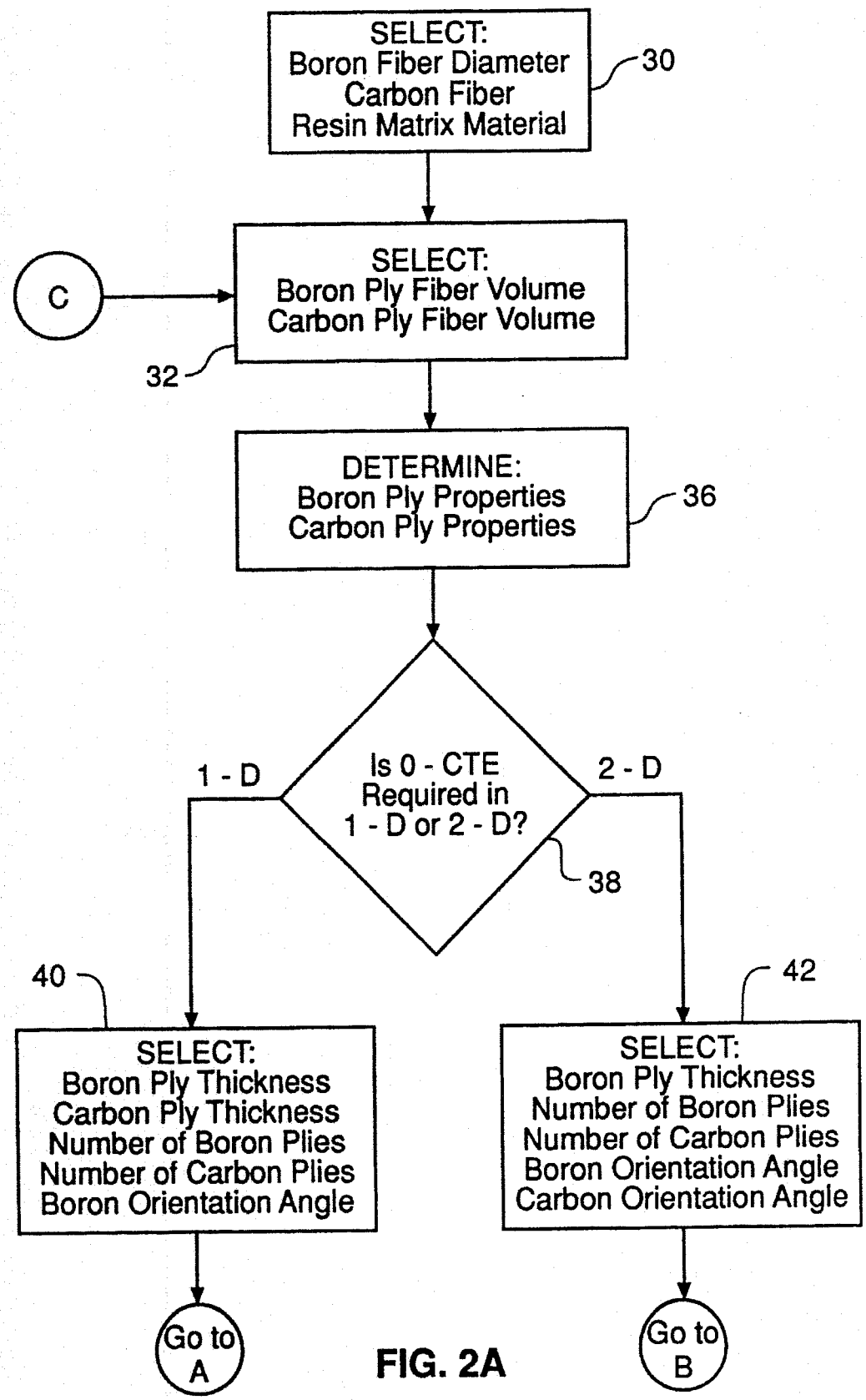
FIG. 2 is a flow chart describing a method of designing a boron/carbon fiber laminate according to the present invention.

FIG. 2 is a flowchart of the process required to design a high specific modulus, near-zero CTE laminate according to the present invention. The process begins at step 30 where the boron fiber diameter is selected. Boron fibers are readily available in 75 μm, 100 μm, and 140 μm diameters (other diameters can be made available as well). At step 30, the carbon fiber is selected as well as the thermosetting resin matrix material. A wide variety of carbon fiber and resin materials are readily available. The laminate design proceeds to step 32 where the fiber volume fractions for the boron plies and carbon plies are selected. With the information from steps 30 and 32, ply properties for the boron plies and carbon plies are determined at step 36. The ply properties are determined by using data supplied by the fiber and/or resin manufacturer(s), testing the materials selected in step 30 at the fiber volume fractions selected in step 32, or using micromechanics to compute ply properties from the mechanical properties of the fiber and resin. A description of the micromechanics theory employed in such computation is found for example in Mechanics of Composite Materials, Robert M. Jones, Copyright 1975 by the Scripta Book Company, Washington, D.C. Any method or combination of methods may be used to determine the ply properties. A 1D or 2D near-zero CTE laminate is selected at step 38.

For a 1D near-zero CTE laminate, the laminate parameters are selected at step 40. The ply thickness of the boron fiber plies, ply thickness of the carbon fiber plies, number of boron fiber plies, number of carbon fiber plies, and the boron plies orientation angles are selected. The laminate is analyzed using the data generated in step 36 and the laminate parameters selected in step 40. The laminate design proceeds to step 52, where the laminate is analyzed using classical lamination theory found in the textbook by Jones on composite mechanics noted above. A computer program package for making the analysis is sold as Mic-Mac from Think Composites, Palo Alto, Calif. The laminate analysis is used at step 52 to generate a graph of laminate CTE versus the orientation angle, Theta, of the carbon fiber ply. The carbon fiber plies are used in pairs. One ply orientation angle is +Theta, the other ply orientation angle is −Theta. This forms a balanced pair of carbon fiber plies. At step 56 the graph of laminate CTE versus orientation angle is examined for values of Theta where the laminate CTE is zero. If a zero-CTE value is not obtained the process is redirected from step 56 to step 32. At this point new fiber volume fractions are selected for the boron plies and/or the carbon plies. The process continues through steps 36, 38, 40, 52, and 56. A new graph of laminate CTE versus orientation angle Theta is generated at step 56. This process loop is continued until a zero-CTE value is found. When a zero-CTE value is obtained the process continues to step 62. At step 62, the Theta value for zero-CTE determined in step 56 is used to determine the specific modulus value at the zero-CTE orientation angle, Theta. The specific modulus obtained is compared to a specific modulus value of $8.9 \times 10^6$ meter, which is a common value for the carbon-only near-zero CTE laminates. If the specific modulus obtained is less than $8.9 \times 10^6$ meter, the process is redirected from step 66 to step 32. If the specific modulus obtained is greater than $8.9 \times 10^6$ meter, the process is ended at step 72. This process yields a 1D near-zero CTE laminate with a specific modulus greater than that which was previously available in the prior art.

For a 2D near-zero CTE laminate, the laminate parameters are selected at step 42. The ply thickness of the boron fiber plies, number of boron fiber plies, number of carbon fiber plies, the boron plies orientation angles, the carbon plies orientation angles are selected. The laminate is analyzed using the data generated in step 36 and the laminate parameters selected in step 42. The laminate design proceeds to step 54. The laminate is analyzed using classical lamination theory found in the textbook by Jones on composite mechanics as noted above. The laminate analysis is used at step 54 to generate a graph of laminate CTE versus carbon fiber ply thickness. At step 58 the graph of laminate CTE versus carbon ply thickness is examined for values of carbon ply thickness where the laminate CTE is zero. If a zero-CTE value is not obtained the process is redirected from step 58 to step 32. At this point new fiber volume fractions are selected for the boron plies and/or the carbon plies. The process continues through steps 36, 38, 42, 54, and 58. A new graph of laminate CTE versus carbon fiber ply thickness is generated at step 58. This process loop is continued until a zero-CTE value is found. When a zero-CTE value is obtained the process continues to step 64. At step 64 the carbon ply thickness value for zero-CTE determined in step 58 is used to determine the specific modulus value at the zero-CTE carbon ply thickness value. The specific modulus obtained is compared to a specific modulus value of $5.2 \times 10^6$ meter, which is a common value for the 2D carbon only near-zero CTE laminates. If the specific modulus obtained is less than $5.2 \times 10^6$ meter the process is redirected from step 68 to step 32. If the specific modulus obtained is greater than $5.2 \times 10^6$ meter the process is ended at step 72. This process yields a 2D near-zero CTE laminate with a specific modulus greater than that which was previously available in the prior art.

The near-zero CTE laminate obtained by the process outlined in FIG. 2 is fabricated using well known manufacturing processes and techniques. Unidirectional prepreg tape is the ply material used in the manufacturing process. The prepreg tape consists of bundles of fibers or fiber tows for carbon plies, or fiber monofilaments for boron plies. The fibers are dispersed or arranged such that they are parallel to one another. The fibers or monofilaments are precoated with uncured resin prior to dispersing or arranging in parallel. The pre-coated fibers or monofilaments form the prepreg tape. The prepreg tape is typically from 75 μm to 375 μm thick. Typical thermosetting resins used are epoxies and cyanate esters. All combinations of carbon and boron fibers, and epoxies and cyanate ester resins are available in prepreg tape.

The composite laminate is prepared, or layed-up, by applying layers of prepreg tape on a tool with the orientation angles for the boron and carbon plies determined in the process outlined in FIG. 2. Upon completion of lay-up, the uncured laminate is cured at the prepreg manufacturers recommended temperature and pressure, most usually in an autoclave. After curing, the laminate is trimmed to the final shape and is ready for use.

1D LAMINATE WORKING EXAMPLE

Figure 3:
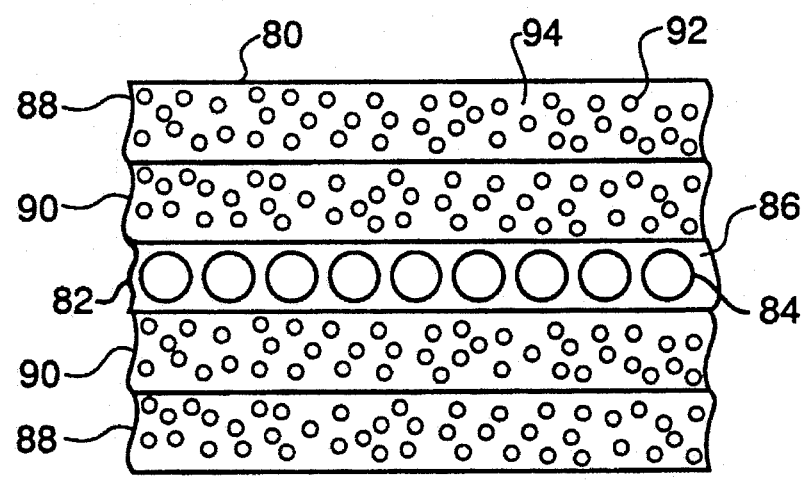
FIG. 3 is a schematic cross section of a working example of a 1D boron/carbon fiber laminate according to the present invention.

FIG. 3 shows a schematic cross section of a high stiffness to weight ratio laminate with near-zero CTE in one direction. The general laminate is designated 80 and is composed of a single boron fiber ply 82 with boron fibers 84 aligned parallel to the reference direction and imbedded in a cyanate ester thermosetting resin 86. The boron fiber ply 82 is embedded between two pairs of carbon fiber plies 88 and 90. The carbon fibers 92 are embedded in a cyanate ester thermosetting resin 94. The carbon fibers 92 in the two outside carbon fiber plies 88 are at a +Theta orientation angle relative to the boron fibers 84. The carbon fibers 92 in the two inner carbon fiber plies 90 are at a −Theta orientation angle relative to boron fibers 84. The five layer laminate 80 or multiples of the five layer laminate 80 are co-cured using standard composite laminate curing techniques.

The laminate for this example was designed using the process described in FIG. 2. A 100 μm diameter boron (400 GPa) fiber (manufactured by Textron Specialty Materials) and an M60J (520 GPa) carbon fiber (manufactured by Toray Industries, Inc) were selected. The matrix material selected was the 954-3 cyanate ester thermosetting resin (manufactured by ICI Fiberire). One boron fiber ply and four carbon plies were selected. The fiber volume fraction for the boron fiber ply was set to 0.50. The fiber volume fraction for the carbon fiber plies was set to 0.62. The boron fiber ply thickness was set to 130 μm. The carbon fiber ply thicknesses were set to 78.125 μm. The boron orientation angle was set to zero-degrees relative to the reference direction. A graph of laminate CTE versus M60J carbon fiber ply orientation angle gave a zero-value at Theta equal to 4.5 degrees. The specific modulus for this laminate in the direction parallel to the boron fibers was $16.7 \times 10^6$ meter. The specific modulus for this laminate is 88% above the $8.9 \times 10^6$ meter specific modulus attainable with carbon-only laminates. The CTE for this laminate in the direction parallel to the boron fibers was 0.00018 μm/m/°C. This laminate is one example representative of the family of 1D near-zero CTE laminates obtainable by combining boron and M60J prepreg tape according to the present invention.

Figure 4:
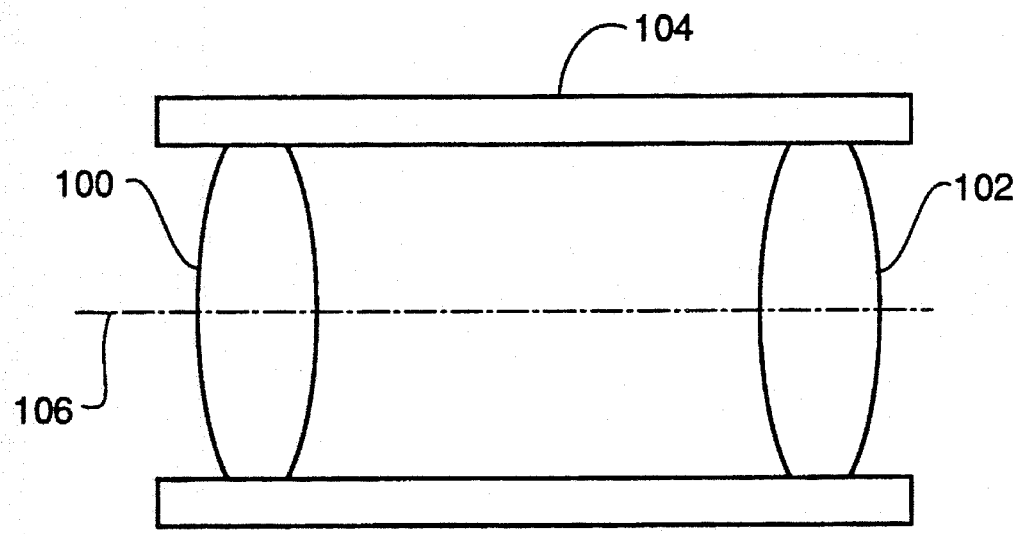
FIG. 4 is a schematic of an optical support structure using a 1D boron/carbon fiber laminate according to the present invention.

The laminate described in this example may be utilized in the optical system shown in FIG. 4. Optical elements 100 and 102 are mechanically supported by a lens tube 104. The lens tube 104 is constructed of the 1D laminate described above. The near-zero CTE laminate would be utilized such that the uniaxial boron ply is parallel to the centerline of the lens tube 106. The CTE parallel to this direction is 0.00018 μm/m/°C. The distance between optical element 100 and optical element 102 will not change significantly as the optical system temperature changes during testing or operation of the optical system due to the near-zero CTE of the lens tube. The high specific modulus requires less material than is required with carbon only laminates to achieve a particular stiffness value. A lens tube 104 of higher stiffness than that which is possible with carbon only laminates can be achieved with the laminate described above.

COMPARISON TO WORKING EXAMPLE

The 1D laminate described in The Working Example is compared to the low-CTE materials listed in Table 1. The specific modulus for the laminate in The Working Example was $16.7 \times 10^6$ meter. This specific modulus is 88% above the $8.9 \times 10^6$ meter specific modulus attainable with the T50 carbon only 1D laminates. The specific modulus for the laminate in The Working Example is 918% above the specific modulus achievable with near-zero CTE Invar. To obtain a given structural stiffness, much less material mass is required when using the laminate in The Working Example since the specific modulus is much greater.

The CTE of the 1D laminate described in The Working Example is 0.00018 μm/m/°C. This CTE is well below the 0.54 μ/mm/°C. of Invar and is equivalent to the CTE possible when using the T300 and T50 carbon-only 1D laminates.

The 1D laminate properties exhibited by the laminate in The Working Example exceeds the properties of the near-zero CTE materials previously available and listed in Table 1.

TABLE I

| Material | Modulus E (GPa) | Density ρ (g/cm³) | E/ρ (m) | CTE (μm/m/°C.) |
|---|---|---|---|---|
| Invar | 131 | 8.14 | $1.64 \times 10^6$ | 0.54 |
| T300 1D Laminate [±1.6] | 123 | 1.49 | $8.4 \times 10^6$ | 0.00018 |
| T50 1D Laminate [±9/90]s | 138 | 1.58 | $8.9 \times 10^6$ | −0.00018 |
| P75 2D Laminate [±45/0/90]s | 85 | 1.66 | $5.2 \times 10^6$ | −0.00018 |

The Working Example described above is just one example representative of the family of solutions that exist by combining boron fiber and M60J fiber. The invention is not restricted to a particular boron fiber diameter, or to a particular carbon fiber, or to a particular matrix material. The present example is intended to illustrate the invention and does not restrict the invention.

2D LAMINATE EXAMPLE

Figure 5:
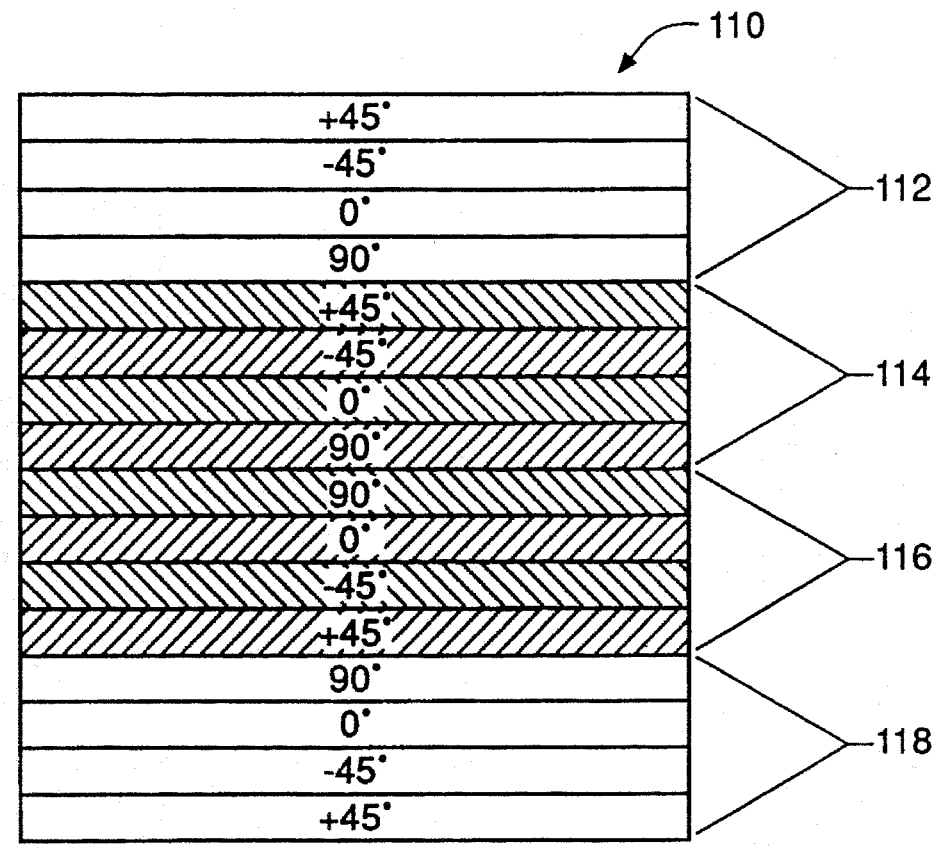
FIG. 5 is a schematic cross section of a 2D boron/carbon fiber laminate according to the present invention.

FIG. 5 shows a schematic cross section of a high stiffness to weight ratio laminate with near-zero CTE in two orthogonal directions. The general laminate is designated 110 and is composed of two groups of carbon fiber plies 112 and 118 and two groups of boron fiber plies 114 and 116. The fiber orientation angles for each ply relative to the reference (0°) direction are shown in FIG. 5. The boron fiber 114 and 116, and carbon fiber plies, 112 and 118, are similar to the boron fiber ply 12 and carbon fiber ply 14 shown in FIG. 1. The thermosetting resin matrix 18 for this example is a cyanate ester resin. This resin is used in the boron fiber plies, 114 and 116, and carbon fiber plies, 112 and 118. The fiber plies shown in FIG. 5 at the orientation angles shown in FIG. 5 represent a quasi-isotropic laminate. This laminate has material properties (modulus, CTE, etc.) that are equal in 2 orthogonal directions, 0° and 90°, as well as any angle between 0° and 360°.

The laminate for this example was designed using the process described in FIG. 2. A 100 μm diameter boron (400 GPa) fiber (manufactured by Textron Specialty Materials) and an M60J (520 GPa) carbon fiber (manufacturing by Tory Industries, Inc.) were selected. The fiber volume fraction for the boron fiber ply was set at 0.65. The fiber volume fraction for carbon fiber ply was set at 0.62. The boron fiber ply thickness was set to 100 μm. Eight boron fiber plies and eight carbon fiber plies were selected. The orientation angles chosen are shown in FIG. 5. A graph of laminate CTE versus carbon ply thickness gave a zero CTE value at a carbon ply thickness of 352 μm. The specific modulus for this laminate is $8.1 \times 10^6$ meter. The CTE for this laminate is 0.00018 μm/m/°C. This laminate is one example representative of the 2D laminates obtainable by combining boron and carbon prepreg tape according to the present invention.

Figure 6:
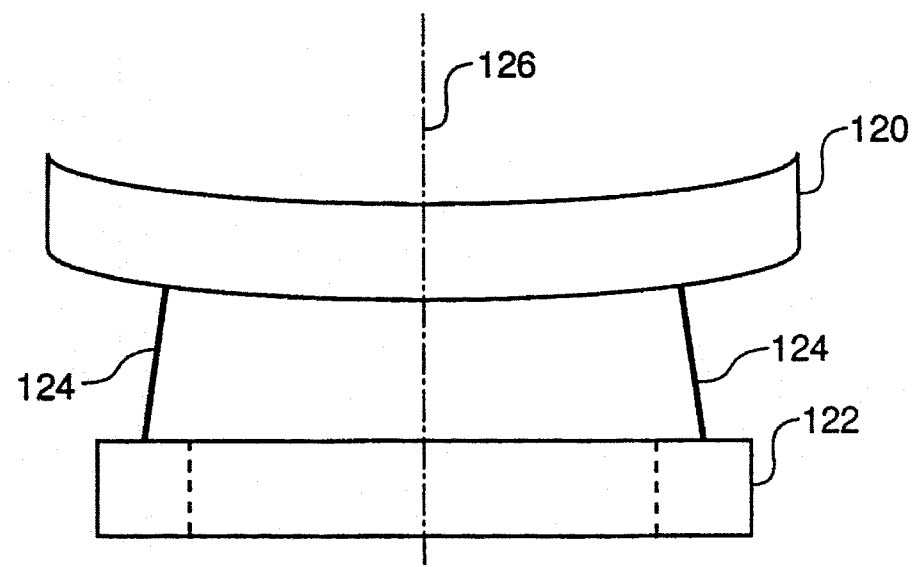
FIG. 6 is a schematic of an optical support structure using a 2D boron/carbon fiber laminate according to the present invention.

The laminate described in this example may be utilized in the optical support structure shown in FIG. 6. The optical element 120 is supported off the optical support structure 122 by support tubes 124. The optical support structure 122 is constructed of the 2D near-zero laminate described above. The distance between the attachment points of the support tubes 124 and the support structure 122 will not change significantly as the optical system temperature changes during testing or operation of the optical system due to the near-zero CTE of the optical support structure. In addition, the support tubes could be constructed of the 1D near-zero CTE laminate described in Working Example 1. The near-zero CTE of the optical support structure 122 in the direction parallel to the optical centerline 126 and in the plane perpendicular to the optical centerline, and the near-zero CTE of the support tube in a direction parallel to the length of the tube will result in insignificant motion of the optical element in all directions as the optical system temperature changes during testing or operation.

COMPARISON TO EXAMPLE 2

The 2D laminate described in Example 2 is compared to the low CTE materials listed in Table 1. The specific modulus for the laminate in Example 2 was $8.1 \times 10^6$ meter. The specific modulus is 55% above the $5.2 \times 10^6$ meter specific modulus attainable with the P75 carbon only 2D quasi-isotropic laminate. The specific modulus for the laminate in Example 2 is 395% above the specific modulus achievable with near-zero CTE invar.

The CTE of the laminate described in Example 2 is 0.00018 μm/m/°C. This CTE is well below the 0.54 μm/m/°C. of Invar and is equivalent to the CTE possible when using the P75 carbon only 2D laminate.

The laminate properties exhibited by the 2D laminate in Example 2 exceeds the properties of the near-zero CTE 2D laminate and near-zero CTE Invar listed in Table 1.

The invention has been described with reference to a preferred embodiment. However, it will be appreciated that variations and modifications can be effected by a person of ordinary skill in the art without departing from the scope of the invention.

PARTS LIST 10 general laminate
12 boron fiber layer
14 carbon fiber layers
16 boron fibers
18 thermosetting resin matrix
20 carbon fibers
22 thermosetting resin matrix
30 select fiber step
32 select ply fiber volume step
36 determine ply property step
38 branch for 1D or 2D
40 select ply thickness, number of plies, and orientation angle for 1D laminate step
42 select ply thickness, number of plies, and orientation angle for 2D laminate step
52 generate graph step
54 generate graph step
56 zero crossing test
58 zero crossing test
62 determine specific modulus step
64 determine specific modulus step
66 specific modulus test step
68 specific modulus test step
72 end
80 general laminate
82 boron fiber ply
84 boron fibers
86 cyanate ester thermosetting resin
88 carbon fiber plies
90 carbon fiber plies 92 carbon fibers
94 cyanate ester thermosetting resin
100 optical element
102 optical element
104 lens tube
106 centerline of lens tube
110 general laminate
112 carbon fiber plies
114 boron fiber plies
116 boron fiber plies
118 carbon fiber plies
120 optical element
122 optical support structure
124 support tubes
126 optical center line

We claim:

1. A boron/carbon fiber 1D laminate comprising a boron fiber layer, a carbon fiber layer having a balanced pair of carbon fiber plies oriented at ±Theta greater than zero with respect to a reference direction, said laminate having a Coefficient of Thermal Expansion between ±0.54 μm/m/°C., a specific modulus greater than 8.9×10$^6$ meter, said fiber layers embedded in a plastic resin matrix.

2. The boron/carbon 1D laminate claimed in 1, comprising a single uniaxial boron fiber ply, two pairs of balanced carbon fiber plies oriented at ±4.5°, said laminate having a Coefficient of Thermal Expansion of 0.00018 μm/m/°C., and a specific modulus of 16.7×10$^6$ meter, embedded in a thermosetting resin matrix.

3. The boron/carbon 1D laminate claimed in claim 1, wherein said boron fiber layer comprises a balanced pair of boron fiber plies.

4. The boron/carbon 1D laminate claimed in claim 2, wherein said thermosetting resin matrix is 954-3 cyanate ester.

5. The boron/carbon 1D laminate claimed in claim 1 comprising a uniaxial boron fiber ply oriented parallel to the reference direction.

6. The optical support structure claimed in claim 2 wherein the uniaxial boron fiber ply is oriented parallel to the reference direction.

7. An optical support structure comprising a boron/carbon fiber 1D laminate having one uniaxial boron fiber ply, a plurality of balanced carbon fiber plies oriented at ±Theta greater than zero with respect to a reference direction, having a Coefficient of Thermal Expansion between ±0.54 μm/m/°C., a specific modulus greater than 8.9×10$^6$ meter, said fiber plies embedded in a plastic resin matrix.

8. A boron/carbon fiber 2D laminate comprising a boron/carbon fiber 2D quasi-isotropic laminate having two sets of quasi-isotropic boron fiber plies, two sets of quasi-isotropic carbon fiber plies, said laminate having a Coefficient of Thermal Expansion between ±0.54 μm/m/°C. in two orthogonal directions, a specific modulus greater than 5.2×10$^6$ meter in two orthogonal directions, said fiber plies embedded in a plastic resin matrix.

9. An optical support structure comprising a boron/carbon fiber 2D quasi-isotropic laminate having two sets of quasi-isotropic boron fiber plies, two sets of quasi-isotropic carbon fiber plies, said laminate having a Coefficient of Thermal Expansion between ±0.54 μm/m/°C., in two orthogonal directions, a specific modulus greater than 5.2×10$^6$ meter in two orthogonal directions, said fiber plies embedded in a plastic resin matrix.

* * * * *